United States Patent [19]

Breitigam et al.

[11] Patent Number: 4,569,956

[45] Date of Patent: Feb. 11, 1986

[54] RAPID CURING EPOXY RESIN ADHESIVE COMPOSITION

[75] Inventors: Walter V. Breitigam, Katy; Roy J. Jackson, Houston, both of Tex.

[73] Assignee: Shell Oil Company, Houston, Tex.

[21] Appl. No.: 638,795

[22] Filed: Aug. 8, 1984

[51] Int. Cl.$^4$ .......................... C08K 3/20; C08L 63/00; C08G 59/68
[52] U.S. Cl. ..................................... 523/402; 523/443; 523/457; 523/459; 523/466; 523/468; 528/91
[58] Field of Search ............... 528/13, 91; 106/287.22; 523/443, 468, 466, 457, 459, 402

[56] References Cited

U.S. PATENT DOCUMENTS

| | | | |
|---|---|---|---|
| 4,358,578 | 11/1982 | Brownscombe | 528/91 |
| 4,376,174 | 3/1983 | Itoh et al. | 523/456 |
| 4,379,908 | 4/1983 | Brownscombe | 528/91 |
| 4,396,754 | 8/1983 | Brownscombe | 528/91 |
| 4,503,161 | 3/1985 | Korbel | 528/91 |

Primary Examiner—Theodore Morris

[57] ABSTRACT

The present invention provides a rapid, low-temperature curing epoxy resin adhesive composition comprising (1) a polyepoxide, (2) a catalytic amount of $HBF_4$, (3) a finely divided filler, preferably an acidic filler, and, optionally, (4) a polyalkylene ether glycol.

11 Claims, No Drawings

RAPID CURING EPOXY RESIN ADHESIVE COMPOSITION

FIELD OF THE INVENTION

The present invention is directed to a rapid curing epoxy resin adhesive composition.

BACKGROUND OF THE INVENTION

The use of various salts of tetrafluoroboric acid have been used to cure or catalyze epoxy resin systems. See, for example U.S. Pat. Nos. 4,379,908 and 4,396,754.

Application and formulation problems still exist with these systems such as handling and nonuniform and inconsistent cures.

It has now been discovered that the active catalyst in such systems appears to be the free tetrafluoroboric acid ($HBF_4$) and not the salts per se. Accordingly, a fast-setting, low temperature curing epoxy resin adhesive system has been developed which cures with catalytic quantities of $HBF_4$.

SUMMARY OF THE INVENTION

The present invention provides a rapid, low-temperature curing epoxy resin adhesive composition comprising (1) a polyepoxide, (2) a catalytic amount of $HBF_4$, (3) a finely divided filler, preferably an acidic filler and, optionally (4) a polyalkylene ether glycol.

DESCRIPTION OF THE PREFERRED EMBODIMENTS

The present invention is particularly directed to a rapid, low-temperature curing epoxy resin adhesive composition comprising (1) an epoxy compound containing at least one vicinal epoxy group, (2) a catalytic amount of $HBF_4$, (3) from about 10 to about 300 parts by weight of a finely divided filler, preferably an acidic filler, per 100 parts by weight of epoxy compound and, optionally, from about 1 to about 50 parts per 100 parts by weight of epoxy compound of polyalkylene glycol.

Polyepoxides

The polyepoxides used to prepare the present compositions comprise those compounds containing at least one vicinal epoxy group; i.e., at least one

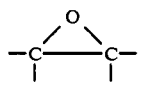

group. These polyepoxides may be saturated or unsaturated, aliphatic, cycloaliphatic, aromatic or heterocyclic and may be substituted if desired with non-interfering substituents such as halogen atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. Pat. No. 2,633,458. The polyepoxides used in the present process are preferably those having an epoxy equivalency greater than 1.0.

Various examples of liquid polyepoxides that may be used in the process of the invention are given in U.S. Pat. No. 2,633,458 and it is to be understood that the disclosure of that patent relative to examples of polyepoxides is incorporated by reference into this specification.

Other suitable polyepoxides are disclosed in U.S. Pat. Nos. 3,356,624, 3,408,219, 3,446,762, and 3,637,618 and the disclosure of these patents relevant to examples of epoxy compounds is incorporated by reference into this specification.

Preferred polyepoxides are the glycidyl polyethers of polyhydric phenols and polyhydric alcohols, especially the glycidyl polyethers of 2,2-bis(4-hydroxyphenyl)propane having an average molecular weight between about 300 and 3,000 and an epoxide equivalent weight between about 140 and 2,000 and more preferably an average molecular weight of from about 300 to about 1000 and an epoxide equivalent weight of from about 140 to about 650.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols or by the reaction of hydrogenated polyhydric phenols with epichlorohydrin in the presence of a suitable catalyst such as a Lewis acid, e.g., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by dehydrohalogenation in the presence of caustic. When the hydrogenated phenol is hydrogenated Bisphenol A, the resulting saturated epoxy compound is sometimes referred to as "diepoxidized hydrogenated Bisphenol A", or more properly as the diglycidyl ether of 2,2-bis(4-cyclohexanol)propane.

In any event, the term "saturated epoxy resin", as used herein shall be deemed to mean the glycidyl ethers of polyhydric phenols wherein the aromatic rings of the phenols have been or are saturated.

Preferred saturated epoxy resins are the hydrogenated resins prepared by the process described in U.S. Pat. No. 3,336,241. Especially preferred are the hydrogenated glycidyl ethers of 2,2-bis(4-hydroxyphenyl)propane, sometimes called the diglycidyl ethers of 2,2-bis(4-cyclohexanol)propane.

Other examples of suitable polyepoxides include the glycidyl ethers of novolac resins, i.e., phenol-aldehyde condensates. Preferred resins of this type are those disclosed in U.S. Pat. No. 2,658,885.

Finely Divided Fillers

In general, most finely divided filler is suitable, however, the acidic fillers are preferred over the basic fillers. Suitable fillers include, among others, carbon black, clay, silica, barium sulfate and mica.

Especially preferred is barium sulfate.

The particle size of the fillers will generally range from about 0.01 microns to about 1.0 mm.

The pH of the fillers are the pH as determined by a 10–20%w suspension in water.

The pH of some common fillers are as follows:

| Filler | pH |
|---|---|
| CaCO$_3$ | 9–10 |
| mica | 8–8.5 |
| silica | 7 |
| BaSO$_4$ | 4 |
| clay | 4 |
| carbon black | 3 |

The amount of filler employed will be an effective amount and will generally range from about 10 parts to about 300 parts by weight based on 100 parts by weight polyepoxide, and preferably from about 10 parts to about 250 parts by weight.

Polyalkylene ether Polyols

Preferred polyalkylene ether polyols are the polyalkylene glycols, particularly polyethylene glycols having a molecular weight between about 200 and 10,000, preferably about 300–1,000.

The polyethylene glycol is employed in an effective amount which is generally in a range from about 1 part to about 50 parts by weight based on 100 parts by weight of polyepoxide.

Preferably, the composition comprises a two-package system wherein the epoxy resin and filler are in one package and the HBF$_4$ (in H$_2$O solution) and polyethylene glycol is in another package. For some applications, a portion of the filler may be in the HBF$_4$ package. Simply, the present adhesive composition is then mixed together and cured.

Of course, other materials may be mixed or added such as thixotropic agents, pigments, plasticizers, etc.

The following examples are given to illustrate the preparation of the present adhesive compositions. It is understood that the examples are embodiments only and are given for the purpose of illustration only and the invention is not to be regarded as limited to any specific components and/or specific conditions recited therein. Unless otherwise indicated, parts and percentages are by weight.

EPOXY RESIN A is a liquid glycidyl polyether of 2,2-bis(4-hydroxyphenyl)propane having a weight per epoxy (WPE) of about 175–190 and an average molecular weight of about 350.

Sparmite is a barium sulfate having an average particle size of about 4 microns.

EXAMPLE I

This example illustrates the preparation of two typical adhesive compositions.

| Resin, % wt. | | Curing Agent, % wt. | | CA1 | CA2 |
|---|---|---|---|---|---|
| Epoxy Resin A | 100 | HBF$_4$ (48% wt in H$_2$O) | | 8 | 12 |
| Sparmite | 200 | Polyether glycol 400 | | 16 | 12 |
| | | Sparmite | | 76 | 76 |

Using a mix ratio of 3 parts by weight of resin to 1 part by weight of curing agent (CA 1 or CA 2), gel times at room temperature were obtained in ca 30 seconds with CA2 and 1.4 minutes with CA1 using about a 20 gram sample. These values can be compared to about 3 to 5 minutes with commercial fast curing epoxy/mercaptan systems and 1 minute with a commercial polyester resin system. Less than 1 minute set times are obtained with the present compositions at 40° F. which are comparable to the polyester resin systems.

In thin film (ca. 0.01 inch), the epoxy CA 1 system will bond aluminum to aluminum in 2.7 minutes at which time full properties are developed. A commercial 5 minute epoxy system requires about 10 minutes to develop bond strength with full property development requiring 24 hours minimum. Ultimate lap shear values of both systems were equivalent after ca. 3 weeks set time at room temperature.

In both dry and wet conditions tested at both 77° F. and 40° F., the developmental systems provide set times and strength values equivalent to a commercial polyester resin in grouting a steel rod in concrete (i.e., mine roof bolt application).

EXAMPLE II

The procedures of Example I were essentially repeated wherein the effect of HBF$_4$ level on reactivity was evaluated. The results are tabulated in Table 1.

TABLE 1

Effect of HBF$_4$ Level on the Reactivity on Epoxy Resin A

| Curing Agent (C.A.) Composition | 1 | 2 | 3 | 4 | 5 |
|---|---|---|---|---|---|
| HBF$_4$ (48% w H$_2$O solution), pbw | 8 | 4 | 8 | 8 | 4 |
| Sparmite (BaSO$_4$), pbw | 20 | 16 | 0 | 0 | 0 |
| PEG-400, pbw | 0 | 0 | 16 | 0 | 0 |
| C.A. Level used with 25 g Epoxy Resin A, pbw | 7 | 5 | 6 | 2 | 1 |
| Active HBF$_4$ content, pbw | 3.84 | 1.92 | 3.84 | 3.84 | 1.92 |
| 25 g Cup Gel Time, 72° F., sec | 7 | 7 | 43 | 8 | 8 |

EXAMPLE III

The procedures of Example I were essentially repeated wherein the effect of polyethylene glycols on reactively of HBF$_4$ was evaluated. The results are tabulated in Table 2.

TABLE 2

Effect of PEG-400 on the Reactivity of HBF$_4$-Catalyzed Epoxy Resin A

| Curing Agent (C.A.) Composition | 1 | 2 | 3 | 4 | 5 |
|---|---|---|---|---|---|
| HBF$_4$ (48% w H$_2$O solution), pbw | 8 | 8 | 8 | 8 | 8 |
| Sparmite (BaSO$_4$), pbw | 0 | 0 | 0 | 20 | 20 |
| PEG-400, pbw | 40 | 16 | 0 | 16 | 0 |
| C.A. Level used with 25 g Epoxy Resin A, pbw | 12 | 6 | 2 | 11 | 7 |
| Active HBF$_4$ content, pbw | 3.84 | 3.84 | 3.84 | 3.84 | 3.84 |

TABLE 2-continued

Effect of PEG-400 on the Reactivity of HBF4-Catalyzed Epoxy Resin A

| Curing Agent (C.A.) Composition | 1 | 2 | 3 | 4 | 5 |
|---|---|---|---|---|---|
| 25 g Cup Gel Time, 72° F., sec | 56 | 43 | 8 | 46 | 7 |

EXAMPLE IV

The procedures of Example I were essentially repeated wherein the effect of a preferred filler ($BaSO_4$, Sparmite) content on the reactivity of $HBF_4$ was evaluated. The results are tabulated in Table 3.

TABLE 3

Effect of Sparmite Content on the Reactivity of Epoxy Resin A Catalyzed with $HBF_4$

| Curing Agent (C.A.) Composition | 1 | 2 | 3 | 4 |
|---|---|---|---|---|
| $HBF_4$ (48% w $H_2O$ solution), pbw | 8 | 8 | 8 | 8 |
| Sparmite, pbw | 76 | 40 | 20 | 0 |
| PEG-400, pbw | 16 | 16 | 16 | 16 |
| C.A. Level used with 25 g Epoxy Resin A, pbw | 25 | 16 | 11 | 6 |
| Active $HBF_4$ content, pbw | 3.84 | 3.84 | 3.84 | 3.84 |
| 25 g Cup Gel Time, 72° F., sec | 46 | 45 | 46 | 43 |

EXAMPLE V

The procedures of Example I were essentially repeated wherein the effect of typical fillers on the reactive of $HBF_4$ were evaluated. The results are tabulated in Table 4.

TABLE 4

Effect of Various Fillers on the Reactivity of Epoxy Resin A Catalyzed with $HBF_4$

| Filler | Aqueous pH | pbw of Catalyst Mixed[a] w/25 g, Epoxy Resin A | days/time[c] at 71° F. | days/time[c] at 71° F. | days/time[c] at 71° F. | days/time[c] at 77° F.[b] |
|---|---|---|---|---|---|---|
| None | — | 6 | 0/45 | — | — | — |
| Carbon Black | 2.5 | 10 | 0/54 | 15/50 | 27/48 | 121/44 |
| Sparmite ($BaSO_4$) | 4.0 | 25.0 | 0/50 | 12/49 | 24/48 | 118/43 |
| Clay (ASP-200) | 4.2 | 10.8 | 0/67 | 12/133 | 24/158 | — |
| Silica (Imsil A-25) | 7.0 | 19.6 | 0/75 | 15/74 | 27/74 | 121/69 |
| Mica | 8.2 | 11.4 | 0/60 | 10/69 | — | 104/74 |
| Calcium Carbonate | 9–10 | 23.9 | No Gel | — | — | — |

[a]Quantity required to give 3.84 pbw active $HBF_4$.
[b]Note temperature is 77° F. (room temperature) which can account for some increase in reactivity (i.e., lower gel time).
[c]Time in seconds.

On the basis of the data presented in the Tables, the following general conclusions appear reasonable and helpful:

1. Gel times are independent of $HBF_4$ content within the range evaluated in the absence of a proton source such as polyethylene glycol.
2. Gel times are not appreciably affected by Sparmite level in range tested.
3. Gel times tend to increase with increase in polyethylene glycol.
4. Acidic fillers (defined by aqueous pH) generally are more stable carriers for $HBF_4$ than are basic ones.

What is claimed is:

1. A composition comprising:
   (a) an epoxy compound containing at least one vicinal epoxy group;
   (b) a catalytic amount of $HBF_4$; and
   (c) from about 10 to about 300 parts by weight, per 100 parts by weight of the epoxy compound, of a finely-divided, acidic filler.

2. The composition of claim 1 wherein the epoxy compound is a glycidyl polyether of a polyhydric phenol.

3. The composition of claim 2 wherein the polyhydric phenol is 2,2-bis(4-hydroxyphenyl)propane.

4. The composition of claim 1 wherein the $HBF_4$ is used as an aqueous solution.

5. The composition of claim 1 which further comprises from about 1 to about 50 parts by weight, per 100 parts by weight of the epoxy compound, of a polyalkylene glycol.

6. The composition of claim 1 wherein the acidic filler is barium sulfate.

7. The composition of claim 5 wherein the filler is used in an amount from about 10 to about 250 parts by weight per 100 parts by weight of the epoxy compound.

8. The composition of claim 5 wherein the polyalkylene ether polyol is polyethylene glycol.

9. The composition of claim 1 in which the acidic filler is selected from the group consisting of barium sulfate, clay and carbon black.

10. The composition of claim 1 in which the particle size of the acidic filler is within the range of about 0.01 microns to about 1.0 mm.

11. The composition of claim 5 in which the acidic filler is barium sulfate.

* * * * *